Feb. 4, 1969  G. WILLIAMS  3,425,687
HANDLING APPARATUS FOR RIGID SHEET MATERIAL
Filed March 27, 1967  Sheet 1 of 4

Inventor
Gordon Williams
By Cushman, Darby & Cushman
Attorneys

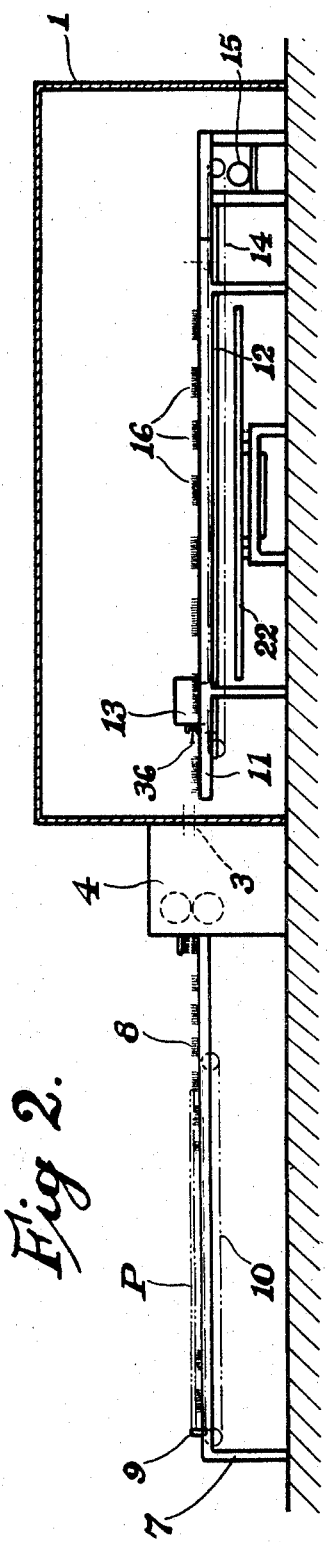

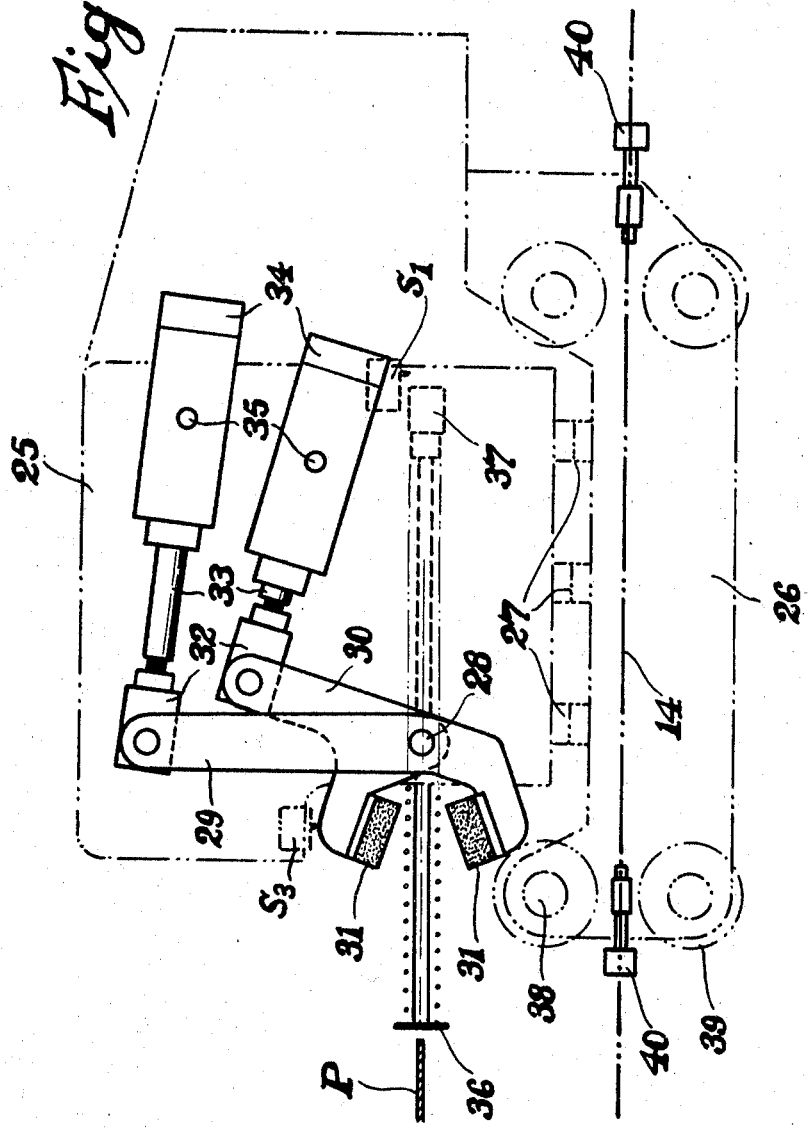

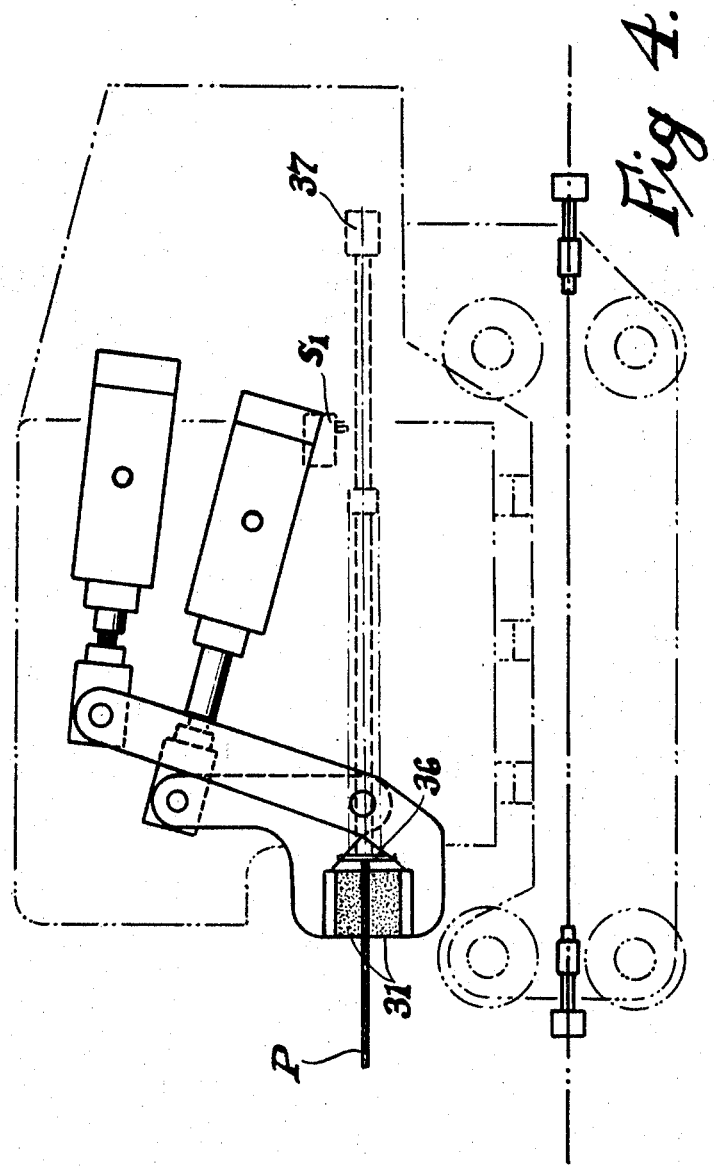

United States Patent Office 3,425,687
Patented Feb. 4, 1969

3,425,687
HANDLING APPARATUS FOR RIGID SHEET MATERIAL
Gordon Williams, Whitley Bay, England, assignor to Formica International Limited, London, England, a British company
Filed Mar. 27, 1967, Ser. No. 626,139
Claims priority, application Great Britain, Apr. 7, 1966, 15,519/66
U.S. Cl. 271—55
Int. Cl. B65h 5/10, 9/10
10 Claims

ABSTRACT OF THE DISCLOSURE

Conveyor apparatus for transporting polished metal plates wherein the leading edges of the plates are in turn gripped by a gripper unit carried by a carriage which is movable in the direction of conveying to draw the plate along a non-scratch support. A probe may be provided on the carriage to sense the correct positioning of a plate to actuate the gripper unit.

---

This invention relates to conveyor apparatus for transporting relatively stiff sheet material from one position to another. More especially it concerns apparatus capable of seizing rigid metallic sheets fed to it by a conveyor in such a manner that the surfaces of the sheets are not marked or damaged in any way.

In a number of industries it is necessary to move metallic sheets such as for example metallic press plates which have specially prepared surfaces, under carefully controlled conditions and in such a manner that the surfaces are not deleteriously affected by the handling apparatus. For example highly polished steel press plates for use in the production of high pressure resinous laminates require such careful handling.

In our British patent specification No. 1,004,765 filed Mar. 29, 1963 there is disclosed an integrated plate cleaning and handling system capable of facilitating the build-up of multiple assemblies of sets of impregnated paper sheets together with interposed polished laminating plates, the assemblies being subsequently fed into a press. In such a system it is essential that the plates are handled without damaging them in any way and furthermore they must be exactly positioned in the assembly so that vertical coincidence is maintained for all the plates; without such coincidence bending stress could be imposed during pressing on any plates which are out of alignment and thus not fully supported.

Our aforementioned patent specification described a first reciprocating pusher-type conveyor capable of feeding plates sequentially into a cleaning stage and a second synchronously driven suction-cup conveyor adapted to engage the underside of each plate to take over its traction after it had been cleaned. Each plate is thereafter moved through a small horizontal distance into an exact predetermined rest position prior to transportation to a building-up table where it is assembled with sets of impregnated paper sheets and other plates to form a multi-laminate stack. In the above described arrangement the whole of the operation after the plate cleaning stage is carried out in a pressurized room in dust free conditions.

It has been found however in practice that the second conveying system, viz, the suction cup may under certain circumstances cause surface marking of the highly polished plates. As these marks occur on the underside of the plates their effect is not apparent at the time to the operators, but the determinal effect is detected later after the pressing process, when surface imperfections have been imparted to the finished laminates.

Whilst suction cups are entirely satisfactory for vertical lifting, they possess an inherent disadvantage when used to grip and convey materials in a horizontal direction as the shear stress of contact tends to mar the coacting surface of the sheet material and furthermore slippage may occur in certain circumstances.

It is one object of this invention to overcome the abovementioned disadvantages by the substitution of the suction cup by a reciprocating gripper thereby to provide a positive engagement of the leading edge of the plate which reduces or avoids surface marring and the possibility of slippage.

This invention is not however restricted to apparatus for use in conjunction with the apparatus claimed in British Patent No. 1,004,765 and in a preferred form the invention provides for the conveyance of rigid sheet material from a first position to a second position, upon the actuation of a control means in the apparatus by pressure contact between it and the edge of sheet material to be conveyed.

According to the invention there is provided a conveyor apparatus for transporting stiff sheet material, comprising a support for sheet material to be conveyed, a carriage movable relative to the support, and a frictional gripper unit mounted on the carriage and adapted frictionally to engage opposite sides of a sheet near one edge thereof for drawing the sheet along the support in a direction parallel to the plane of the sheet. The carriage may conveniently be mounted on or between guide rails and be adapted to be driven thereon for example by an electric motor. In its preferred form the apparatus is especially suitable for conveying stiff sheet material which is self supporting in the form of a metallic plate.

Preferably the gripper unit comprises a pair of jaws pivotally mounted on the carriage for actuation by one or more pneumatic or hydraulic power cylinders.

Preferably the actuation of the gripper unit is initiated by means of a spring loaded plate-sensing probe resiliently mounted on the carriage and positioned in advance of the gripper jaws in alignment with the edge of the plate.

The gripper unit may be synchronously driven in accordance with the movement of an initial or first plate conveyor so arranged that the plate is conveyed at a substantially constant speed through the system and the plate may be passed through a processing stage in the course of its conveyance to the gripper unit; means may also be provided for accurately positioning the plate after it has been released by the gripper unit.

The invention will now be more fully described, merely by way of example, with reference to the following drawings in which:

FIGURE 2 is a vertical cross-section taken substantially along the line II—II of FIGURE 1; and FIGURES 3 and 4 are diagrammatic elevations to a larger scale of two different working positions of the gripper mechanism of this conveyor.

Figure 1:
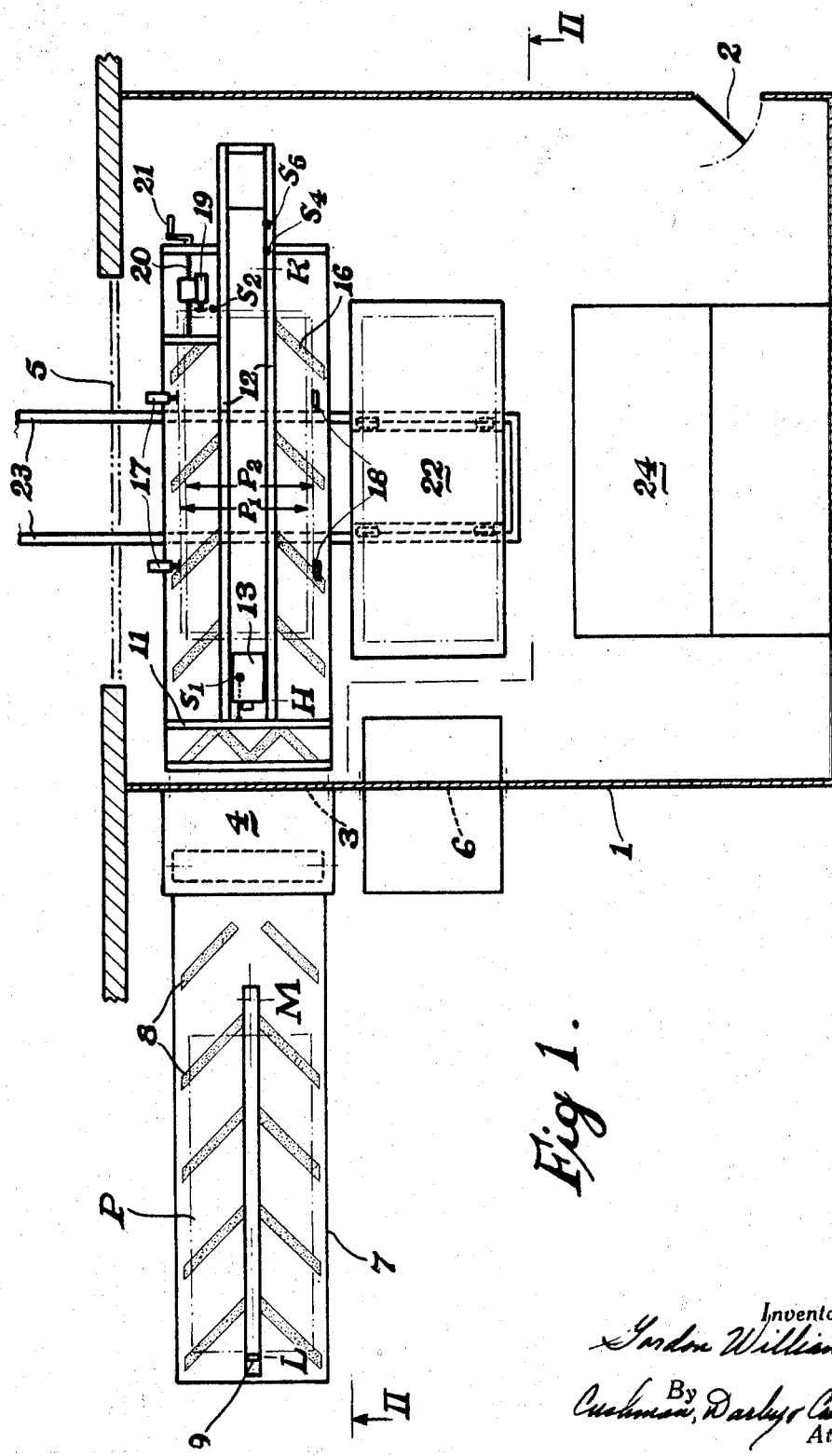
FIGURE 1 is a plan view of a plate handling system embodying the invention and incorporating a reciprocating gripper conveyor.

The general arrangement of a pressurized dust-free room and plate handling apparatus is shown in FIGURES 1 and 2. A substantially sealed room 1 is shown as including a doorway 2, a horizontal slit opening 3 sealed by means of rubber fllaps from a rotary brush cleaning unit 4 and an exit aperture 5 for finished products from the room. A further slit opening 6 is included for the entry of caul plates used in the making up of laminate assemblies and furthermore an air duct (not shown) is provided in the roof of the room to admit a supply of filtered air.

A first plate feeding apparatus is provided externally of the dust-free room and cleaning unit 4 and comprises a framework 7 having an upper non-marring plate support surface consisting of a plurality of upturned brushes, generally shown at 8, capable of supporting a double-sided polished laminating plate P.

A horizontal pusher 9 is provided in the centre of the framework for engaging the rear end of a plate P as shown. The pusher is reciprocable between the limit positions L and M by means of a chain 10 (FIGURE 2) for propelling successive plates P so that the leading edge of each plate is advanced into the interior of the room via the cleaning unit 4.

A second horizontal framework 11 in alignment with the framework 7 is provided within the room 1. The framework 11 includes a central trough bounded by a pair of parallel rail members 12 which constitute the working surfaces for a carriage carrying a gripper unit indicated at 13 capable of reciprocating between limit positions H and K. The gripper unit carriage is attached to a chain 14 driven by a reversible geared electric motor 15. The support surface of the framework 11 comprises a plurality of upturned brushes 16 arranged in herringbone formation on each side of the central trough 12.

Two air-actuated pushers 17, in conjunction with fixed stops 18, are provided for positioning each plate in an exact predetermined lateral position and a single air-actuated pusher 19, with a limited operating stroke, is provided for engaging the leading edge of each plate to position it in an exact predetermined longitudinal position. To enable the apparatus to accommodate plates of different sizes adjustment means are provided to enable the stops 18 to be sited in alternative positions and furthermore the pusher 19 is mounted on a slidable carriage capable of being moved longitudinally by means of a screw 20 and operating handle 21.

A laying-up table 22 is provided adjacent to and at a lower level than the framework 11. This table is provided with rollers which are capable of running within parallel channel-section guide rails 23 which pass below the framework 11 and associated components and thence out of the room through the exit aperture 5.

The room also includes a table 24 for receiving resin-impregnated paper sheets required for making up the assemblies, and a suction-cup type conveyor (not shown) capable of lifting, traversing and lowering a plate from the support surface of the framework on to the laying-up table 22. The latter conveyor is programmed in accordance with the functions of the previously described conveyors and is provided with limit stops to ensure that it traverses through an exact predetermined distance at each cycle of operation thereby to ensure that as the plates are layed on the laying-up table, they are vertically aligned within the stack.

The reciprocating gripper unit will now be described with reference to FIGURE 3. The structure of the unit comprises upper and lower fabricated frame components 25 and 26 bolted together at 27 to form a carriage. The upper component is provided with a transverse bearing pin 28 which forms a common pivot for gripper levers 29 and 30. Each lever comprises a pair of spaced plates terminating with bridging strips onto which gripper friction pads 31 are attached. The upper arms of the two levers are drilled to accept pivotally mounted blocks 32 which are in turn tapped at right angles to the pivots to receive the screwed ends of piston rods 33 connected to pistons slidable in pneumatic cylinders 34. To permit arcuate movement of the blocks 32 the cylinders 34 are arranged to oscillate on trunnion bearings 35 attached to each side of the cylinder barrels and carried in holes drilled in the frame component 25. Limit stops (not shown) are mounted on the inside of the frame to abut the levers at the ends of their stroke and thus provide positive rest positions when the cylinders are vented to atmosphere.

The cylinders are pneumatically connected in such a manner that the admission of compressed air will cause the piston rod attached to lever 29 to retract and the piston rod attached to lever 30 to extend. Thus the friction faces 31 will come together and grip the plate therebetween as is illustrated in FIGURE 4.

A spring loaded switch-actuating plunger or probe 36 is mounted adjacent to one side of the bearing pin 28, in alignment with the edge of the plate. The rear end of the plunger is provided with a rigidly attached cam 37 the external surface of which is capable of coacting with and operating a limit switch $S_1$ mounted on the frame 25.

The lower frame component 26 comprises a pair of spaced frame plates having four bushes welded on their inner faces to form bearings for transverse shafts 38 on to which are mounted eight wheels 39. The wheels are grooved on their cylindrical surfaces so as to engage with the rail members 12 (FIGURE 2). Chain anchors 40 mounted on the inside of the frames 26, connect the whole unit to the driven traction chain 14 (FIGURE 2).

A solenoid operated air-valve is included in the gripper unit to control the actuation of the gripper jaws and further the whole system is provided with limit switches which will be referred to in the following description of the sequence of operation of the apparatus.

At the commencement of the feeding cycle the gripper unit is positioned at H as shown in FIGURES 1 and 2 with the gripper jaws in the open position. A plate removed from a previous press cycle is placed on the framework 7 as is shown by symbol P.

The cycle commences by the pusher 9 travelling along the framework 7 and pushing the leading edge of the plate through the cleaning stage 4 and on to the framework 11 within the sealed room 1. The leading edge of the plate strikes the tip of the spring-loaded plunger 36 and displaces the switch cam 37 attached thereto. The effect of this is to close the switch $S_1$ which completes a circuit to the driving motor and thus propels the gripper unit along the guide rails 12. Initially the plate travels faster than the gripper unit and consequently the spring-loaded plunger is further displaced so that the switch $S_1$ opens again with the result that the sequence controller (in circuit with $S_1$) completes a circuit to energize the solenoid-operated air valve which causes the gripper jaws to close and grip the leading edge of the plate by which time the gripper unit is moving at the same speed as the plate.

The gripper unit pulls the plate along the brush support surface of the framework 11 until the leading edge of the plate strikes a plunger connected to a limit switch $S_2$ on the slidable carriage carrying the longitudinal air-operated pusher 19 (FIGURE 1). Closure of $S_2$ completes a circuit in the sequence controller which de-energizes the solenoid of the air-operated valve on the carriage thereby to actuate the gripper cylinders and release the plate. Opening of the upper gripper jaw depresses a limit switch $S_3$ mounted on the gripper unit (see FIGURE 3) which holds the grippers in the open position as shown. The gripper carriage continues to travel along the guide rails 12 until it strikes two further limit switches $S_4$ and $S_5$ which cause the driving motor to "slow down" and "stop" respectively and additionally the spring-loaded plunger returns to its initial position (FIGURE 3). The ultimate position of the gripper unit is indicated at K in FIGURE 1. Operation of the switch $S_5$ also initiates the functioning of the air-actuated pushers 17 and 19 which slide the plate from an initial rest position $P_1$ to an exact predetermined position $P_2$ against the stop members 18. The three pushers return to their retracted positions when the aforementioned suction type plate lifting conveyor (not shown) descends on to the plate surface and raises it clear of the above described apparatus. When the plate reaches this position a switch on the lifter completes a circuit to the sequence controller and the gripper driving motor reverses and returns the gripper unit to its starting position at H ready to receive the following plate. Additional interconnected control means are provided to prevent the feeding of the next plate on the support surface until the previous plate has been lifted by the suction type plate lifting conveyor.

The above description is primarily intended to describe the construction and functioning of the reciprocating gripper mechanism, and it will be realised that the other ancilliary devices are included in the plate handling system as a whole. For example various limit switches are provided to control stopping and starting of certain minor components and furthermore the overall sequence control system is described only in general terms.

I claim:

1. In conveyor apparatus for transporting polished metal plates and comprising a fixed non-scratch support for said plates and a carriage engageable with the plates and mounted for movement relative to said support, the improvement which comprises a frictional gripper unit mounted on said carriage and operable frictionally to engage opposite sides of a plate near one edge thereof for drawing the plate along the support in a direction parallel to the plane of the plate, a plate-sensing probe carried by the carriage for engagement and deflection by the leading edge of a plate fed to said gripper unit, and a swtich operable by said probe for initiating actuation of said gripper unit responsive to positioning of a plate to be gripped adjacent to said gripper unit.

2. Apparatus according to claim 1, wherein said non-scratch support comprises upwardly projecting brushes arranged herringbone fashion in direction of movement of said carriage.

3. In conveyor apparatus for transporting stiff sheet material and comprising a support for sheet material to be conveyed, a carriage movable relative to the support, a frictional gripper unit mounted on the carriage and adapted frictionally to engage opposite sides of a sheet near one edge thereof for drawing the sheet along the support in a direction parallel to the plane of the sheet, the improvement which comprises a sheet-sensing probe carried by the carriage for sensing the positioning of a sheet relative to the carriage.

4. Apparatus according to claim 3, wherein the probe is adapted to be movable against a spring bias relative to the carriage upon advance of a sheet to the gripper unit.

5. Apparatus according to claim 3, including a switch actuatable by movement of the probe, said switch being adapted to initiate operation of the gripper unit.

6. Apparatus according to claim 3, wherein the support is fixed and comprises a plurality of upstanding brushes arranged in herringbone fashion longitudinally of the direction of movement of the carriage.

7. Apparatus according to claim 3, comprising guide rails carrying the carriage for movement therealong, drive means for moving the carriage along the guide rails, said drive means including an electric drive motor, and a chain drivable by the motor and secured to the carriage.

8. Apparatus according to claim 3, wherein the gripper unit comprises a pair of jaws pivotally mounted on the carriage, friction pads carried by the jaws for engaging opposite sides of a sheet and fluid pressure operable piston and cylinder assemblies individual to each gripper jaw for operating the gripper jaws.

9. Apparatus according to claim 3, including a gripper unit control switch for causing the gripper unit to release a sheet when the gripper unit has advanced the sheet to a predetermined position, and means for accurately positioning a sheet after it has been released by the gripper unit.

10. Apparatus according to claim 9, wherein said positioning means comprise a stop and fluid pressure operable pusher mechanism adapted to push a released sheet against said stop.

References Cited

UNITED STATES PATENTS

| | | | |
|---|---|---|---|
| 2,166,381 | 7/1939 | Taylor | 198—210 |
| 2,883,172 | 4/1959 | Mitchell | 198—127 |
| 2,959,412 | 11/1960 | Sjostrom | 271—84 |
| 3,039,812 | 6/1962 | Nimeskern | 294—88 |

FOREIGN PATENTS 293,137    9/1953   Switzerland.

RICHARD E. AEGERTER, *Primary Examiner.*

U.S. Cl. X.R.

214—1.7